(12) United States Patent
Carter

(10) Patent No.: US 6,430,610 B1
(45) Date of Patent: *Aug. 6, 2002

(54) TCP/IP ADDRESS PROTECTION MECHANISM IN A CLUSTERED SERVER ENVIRONMENT

(75) Inventor: Edward D. Carter, Columbia, SC (US)

(73) Assignee: Steeleye Technology, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/145,370

(22) Filed: Sep. 2, 1998

(51) Int. Cl.[7] .............................. G06F 15/16; H04L 1/22
(52) U.S. Cl. ........................................ 709/221; 714/47
(58) Field of Search ................................ 709/224, 239, 709/242, 245, 249, 221; 345/334, 335; 714/47, 48

(56) References Cited

U.S. PATENT DOCUMENTS

| | | | |
|---|---|---|---|
| 5,239,537 A | | 8/1993 | Sakauchi ...................... 370/16 |
| 5,278,823 A | | 1/1994 | Handel ......................... 370/13 |
| 5,463,615 A | | 10/1995 | Steinhorn ..................... 370/16 |
| 5,465,330 A | | 11/1995 | Komatsu et al. ............ 395/824 |
| 5,473,599 A | * | 12/1995 | Li et al. ........................ 370/16 |
| 5,535,336 A | | 7/1996 | Smith et al. ........... 395/200.06 |
| 5,557,747 A | | 9/1996 | Rogers et al. .......... 395/200.11 |
| 5,668,952 A | * | 9/1997 | Slane .......................... 709/245 |
| 5,724,510 A | * | 3/1998 | Arndt et al. ................. 709/220 |
| 5,774,640 A | * | 6/1998 | Kurio ............................. 714/4 |
| 5,802,302 A | * | 9/1998 | Waclawsky et al. ........ 709/224 |
| 5,819,028 A | * | 10/1998 | Manghiramalani et al. ...... 395/185.1 |
| 5,819,033 A | * | 10/1998 | Caccavale .............. 395/200.11 |
| 5,819,045 A | * | 10/1998 | Raman et al. ............... 709/224 |
| 5,822,531 A | * | 10/1998 | Gorczyca et al. ........... 709/221 |
| 5,845,080 A | * | 12/1998 | Hamada et al. ............. 709/224 |
| 5,889,776 A | * | 3/1999 | Liang ........................... 370/389 |
| 5,918,017 A | * | 6/1999 | Attanasio et al. ........... 709/224 |
| 5,919,248 A | * | 7/1999 | Kahkeska et al. .......... 709/224 |
| 5,923,854 A | * | 7/1999 | Bell et al. .................... 709/243 |
| 5,948,069 A | * | 9/1999 | Kitai et al. .................. 709/240 |
| 5,980,078 A | * | 11/1999 | Krivoshein et al. ............ 700/1 |
| 5,991,264 A | * | 11/1999 | Croslin ........................ 370/255 |
| 5,999,179 A | * | 12/1999 | Kikic et al. ................. 345/349 |
| 6,003,090 A | * | 12/1999 | Puranik et al. ............. 709/235 |
| 6,009,475 A | * | 12/1999 | Shrader ....................... 709/249 |
| 6,012,096 A | * | 1/2000 | Link et al. ................... 709/233 |
| 6,026,499 A | * | 2/2000 | Shirakihara et al. .......... 714/11 |
| 6,031,528 A | * | 2/2000 | Langfahl, Jr. ............... 345/334 |
| 6,049,825 A | * | 4/2000 | Yamamoto .................. 709/220 |
| 6,064,671 A | * | 5/2000 | Killian ........................ 370/389 |
| 6,134,678 A | * | 10/2000 | Mahalingam et al. ......... 714/48 |

OTHER PUBLICATIONS

RFC 792, J. Postel, Internet Control Message Protocol, http://rfc.fh–koeln.de/doc/rfc/html_gz/rfc.html.gz, 18 pages, Sep. 1981.*

RFC 1541,R. Droms, Dynamic Host Configuration Protocol, http://rfc.fh–koeeln.de/doc/rfc/html_gz/rfc.htm.lgz, 39 pages, Oct. 1993.*

Source Document for the IP Recovery Kit for LifeKeeper 1.0 On–Line Help, Dec. 7, 1995.

* cited by examiner

Primary Examiner—Robert B. Harrell
Assistant Examiner—Bunjob Jaroenchonwanit
(74) Attorney, Agent, or Firm—Nelson Mullins Riley & Scarborough

(57) ABSTRACT

A method and apparatus are disclosed which perform a simple check of the network adapter by sending a message to an address of a local adapter. If the message is not sent, then a more in depth check of the network is performed. The local computer sends a request to a first remote computer to ping the adapter on the local computer. If this ping is successful, then the local computer sends a request to a second remote computer to ping the adapter on the local computer. The pinging by two computers provides confirmation that the network adapter is functional. If both of the pings are unsuccessful, then the address of the network adapter is moved to another adapter on another computer.

8 Claims, 5 Drawing Sheets

TCP/IP ADDRESS PROTECTION MECHANISM IN A CLUSTERED SERVER ENVIRONMENT

FIELD OF THE INVENTION

The present invention relates generally to the monitoring of IP Internet Protocol (IP) addresses on a plurality of computer networks, and more particularly, to monitoring of a local network adapter having IP addresses by the local computer connected to the network adapter.

BACKGROUND OF THE INVENTION

A wide-area network (WAN) is a computer network that spans a relatively large geographical area. Typically, a WAN includes two or more local-area networks (LANs). Computers connected to a wide-area network are often connected through public networks, such as the telephone system. Computers can also be connected to a WAN through leased lines or satellites. The largest WAN in existence is the Internet.

Each computer on the WAN includes a network adapter. A network adapter is a circuit board that plugs into a slot in a computer and has one or more sockets to which cables are attached. In a local-area computer network having multiple computers and a network cable connecting the multiple computers, each of the network adapters provides a physical communication path between an associated computer and the network cable. A network adapter can also be called a network adapter card, a network card, and a network interface card. For example, in FIG. 1, a wide-area computer network 10 has five computers A, B, C, D, E, each having a corresponding network adapter NA, NB, NC, ND, NE. Computers A and B form a first LAN 12 and are connected to a network cable 14. Computers A and B are connected to a communication device 30 and computers C and D are connected to a communication device 40. Devices 30 and 40 can be routers, gateways, etc. Computers C and D form a second LAN 20 and are connected to a network cable 22. Computer E is a stand alone computer. Network cables 14, 22 and computer E are connected to a network 50.

Each network adapter NA, NB, NC, ND, NE has one or more network addresses to which communications can be directed. A network address is a unique identifier of a network device on the computer network, and is usually represented as a number or series of numbers. The failure of a network adapter can disconnect the associated computer from the computer network. If one computer is processing tasks for another computer on the computer network, the failure of a network adapter can disable the entire computer network.

On a Windows NT computer network, a utility is provided for checking communication paths between computers on the computer network. This utility is known as Packet Internet Groper and is called (PING). PING can be invoked from time to time to check network communication paths. PING uses the Transmission Control Protocol/Internet Protocol (TCP/IP). TCP/IP is an industry standard suite of networking protocols, enabling dissimilar nodes in a heterogeneous environment to communicate with one another. This means that TCP/IP allows two computers to communicate even though the two computers have different network operating systems. PING uses Windows socket-style name resolution to resolve the name to an address, so if pinging by address succeeds but pinging by name fails, the problem lies in address resolution, not network connectivity. Using PING, the syntax is PING IP address or PING host (for example, PING 199.199.199.2 or PINGmicrosoft.com).

For example, in FIG. 1, to monitor whether computer A is connected to the local-area computer network, computer A can be pinged using the PING utility from computer B using either the address or the name or both. To monitor whether computer A is connected to the wide-area computer network, computer A can be pinged using the PING utility from either computer C, D or E using either the address or the name or both. A message is sent from the receiving computer back to computer A. The sending computer then looks for a reply from computer A. If a reply is received by the sending computer, then computer A is considered to be connected to the computer network. If no response is received by the sending computer, then computer A is not considered to be in communication with the computer network.

The disadvantage of the PING utility is that although a computer can be pinged, the echo/reply packet cannot be specified to be sent to the computer from a specific computer through a specific network adapter. Instead, PING looks to routing tables used by Windows NT. For example, using PING, the echo/reply packet may be sent to computer A by either computers B, C, D or E. The echo/reply packet would be sent by any of these computers and returned to the sending computer. It would be difficult to periodically monitor each of the network adapters on a WAN using the PING utility because the address of the sending computer cannot be specified. Thus, to monitor each of the network adapters on a computer network, either WAN or LAN, would be complex using the PING utility because look up tables would be required, requiring periodic updating.

A method of checking nodes on a computer network is disclosed in U.S. Pat. No. 5,668,952. A node is any addressable device on a computer network. Each computer on a LAN can be checked by sending an address resolution protocol (ARP) request to a computer on the LAN. ARP is a method used to determine the physical address of a target host. ARP is a part of the Internet Protocol (IP) and enables a host that knows only the logical (IP) address of a target host to find the physical (Media Access Control or MAC) address of the same target host. ARP can only be used on networks capable of hardware broadcasts. MAC is in the Data-Link Layer (Layer 2 of the OSI Reference Model) that controls the use of network hardware and governs access to transmission media. This sublayer is defined in the Institute of Electronic and Electrical Engineers (IEEE) 802.x set of local area network (LAN) standards. Disadvantageously, this method is limited to LANs because the ARP requests cannot be sent through routers, gateways, and the like.

A need exists for a method of monitoring network adapters on a WAN that can keep track of potentially failed network adapters to prevent the WAN or LAN from disabling a computer network.

SUMMARY OF THE INVENTION

It is, therefore, an object of the present invention to provide a method for determining if an address of a network adapter is functioning from a local computer.

It is another object of the present invention to provide a method and apparatus for a local computer to determine if an address of a local adapter is functioning and report to an address monitoring program whether the network adapter is functional.

These and other objects of the present invention are achieved by a method and apparatus which performs a simple check of the network adapter by sending a message to an address of a local adapter. If the message is not sent, then a more in depth check of the network is performed. The local computer sends a request to a first remote computer to ping the adapter on the local computer. If this ping is successful, then the local computer sends a request to a second remote computer to ping the adapter on the local computer. The pinging by two computers provides confirmation that the network adapter is functional. If both of the pings are unsuccessful, then the address of the network adapter is moved to another adapter on another computer.

The foregoing objects of the present invention are also achieved by a method of monitoring a network address and moving the network address. A data packet is sent from a first computer through an address of a local adapter. It is determined if the data packet was sent. If the data packet was not sent, then the first computer requests that a second computer send an echo/reply packet to the address of the adapter on the first computer. If the reply packet was not returned to the second computer, the address is moved to a different adapter.

The foregoing objects of the present invention are also achieved by an article having at least one sequence of machine executable instructions on a medium bearing the executable instructions in machine readable form, wherein execution of the instructions by one or more processors causes the one or more processors to send a data packet from a first computer to an address of a local adapter. It is determined if the data packet was sent. A second computer is requested, if the data packet was not sent, to send an echo/reply packet to the address of the adapter on the first computer. If the reply packet was not returned to the second computer, the first computer causes the address to be moved to a different adapter.

The foregoing objects of the present invention are also achieved by a computer system having a processor and a memory coupled to the processor, the memory having stored therein sequences of instructions, which, when executed by the processor, causes the processor to send a data packet from a first computer to an address of a local adapter. The first computer determines if the data packet was sent. The first computer requests a second computer, if the data packet was not sent, to send an echo/reply packet to the address of the adapter on the first computer. If the reply packet was not returned to the second computer, the first computer causes the address to be moved to a different adapter.

The foregoing objects of the present invention are also achieved by a computer architecture including sending means for sending a data packet from a first computer through an address of a local adapter. Determining means are provided for determining if the data packet was sent. Requesting means are provided for requesting by the first computer, if the data packet was not sent, that a second computer send an echo/reply packet to the address of the adapter on the first computer. If the reply packet was not returned to the second computer, moving means are provided for moving the address to a different adapter.

Still other objects and advantages of the present invention will become readily apparent to those skilled in the art from following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

A method and apparatus for monitoring network adapters having IP addresses on a plurality of computer networks according to the present invention are described. In the following detailed description, for purposes of explanation, numerous specific details are set forth in order to provide a thorough understanding of the present invention. It will be apparent, however, that the present invention may be practiced without these specific details. In other instances, well-known structures and devices are shown in block diagram form in order to not unnecessarily obscure the present invention.

The present invention is preferably used in Windows NT environments. The present invention forms a subsystem on the LifeKeeper™ for Windows NT® available from NCR Corporation which is described in greater detail in Life-Keeper™ for Windows NT®: High Availability Clustering for Open Systems which is incorporated by reference in its entirety into this specification. LifeKeeper™ is an application for providing recovery action software for core software and communications components. LifeKeeper™ is used in clustered systems and recognizes hardware faults preventing a network failure should, in the situation described herein, a network adapter failure occur. When a network adapter is considered to have faults, another network adapter in the cluster assumes the functionality of the faulty network adapter so that the cluster remains operational.

The present invention is related to co-pending application entitled "ECHO REPLY PROGRAM WHICH EXECUTES THROUGH A SPECIFIED ADAPTER" filed on even date herewith and assigned to the instant assignee and which is hereby incorporated by reference in its entirety into this specification.

Figure 1:
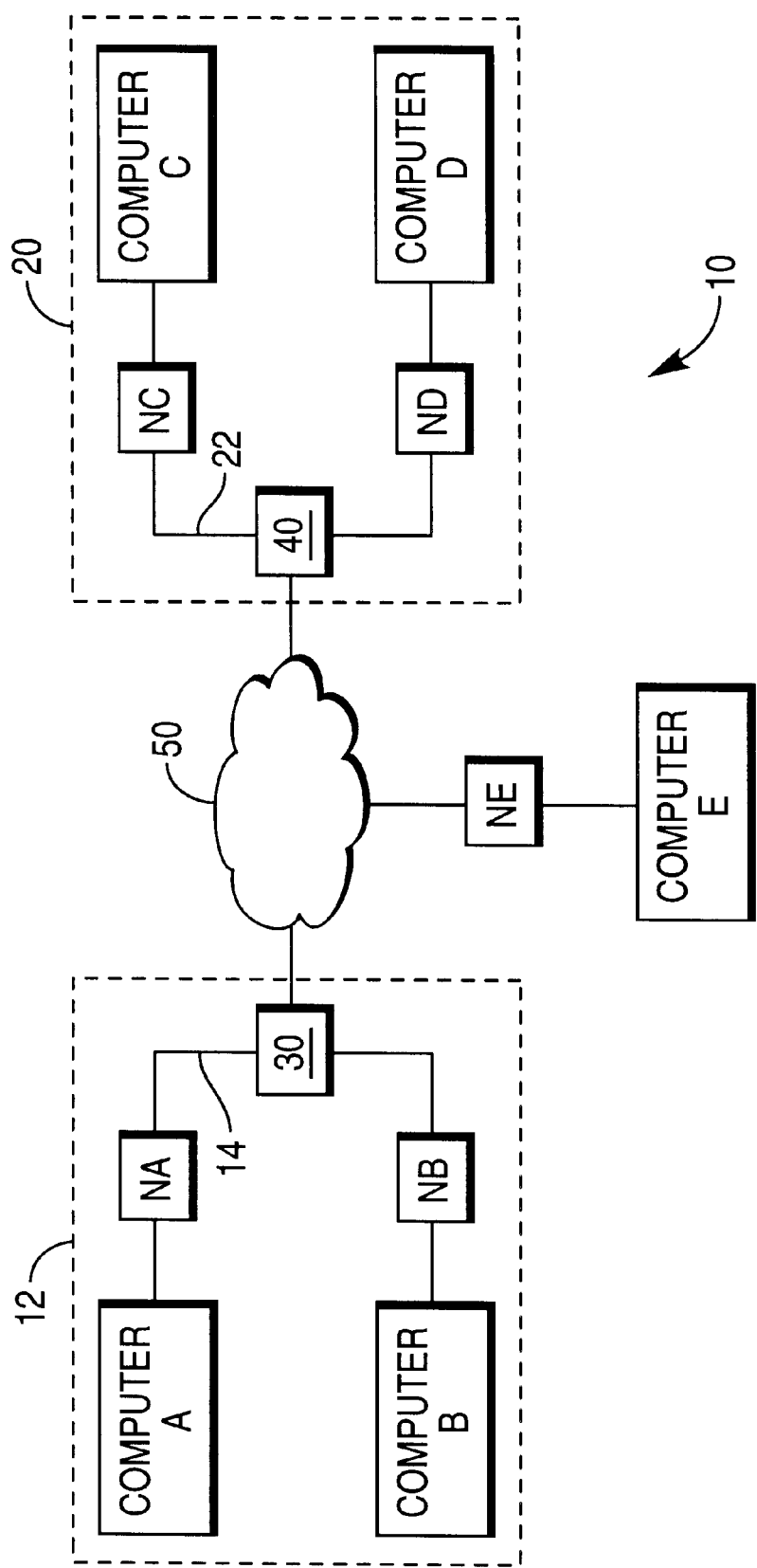
FIG. 1 is a block level diagram of a prior art wide-area computer network.

As previously described, FIG. 1 is a block diagram of an exemplary wide-area computer network 10 which can include two or more LANs and stand-alone computers. LANs 12 and 20 each include a plurality of network devices including the computers A, B, and C, D and network adapters NA, NB and NC, ND, respectively. On each LAN any one of the computers A, B and C, D can be used as the server. The network devices can also include devices such as hosts, servers and personal computers. Computers A, B, C, D, E can be identical or can be different. The present invention is usable on such networks as ARCnet, Ethernets and Token-Ring networks, wireless networks, among other networks. The networks 12, 20, in this example, each has a central network cable 14, 22 also known as media, which can be of any known physical configuration including unshielded twisted pair (UTP) wire, coaxial cable, shielded twisted pair wire, fiber optic cable, and the like. Alternatively, the network devices could communicate across wireless links. As can be appreciated, many other and additional devices can be coupled to the network including additional personal computers, mini-mainframes, mainframes and other devices not illustrated or described which are well known in the art.

Figure 2:
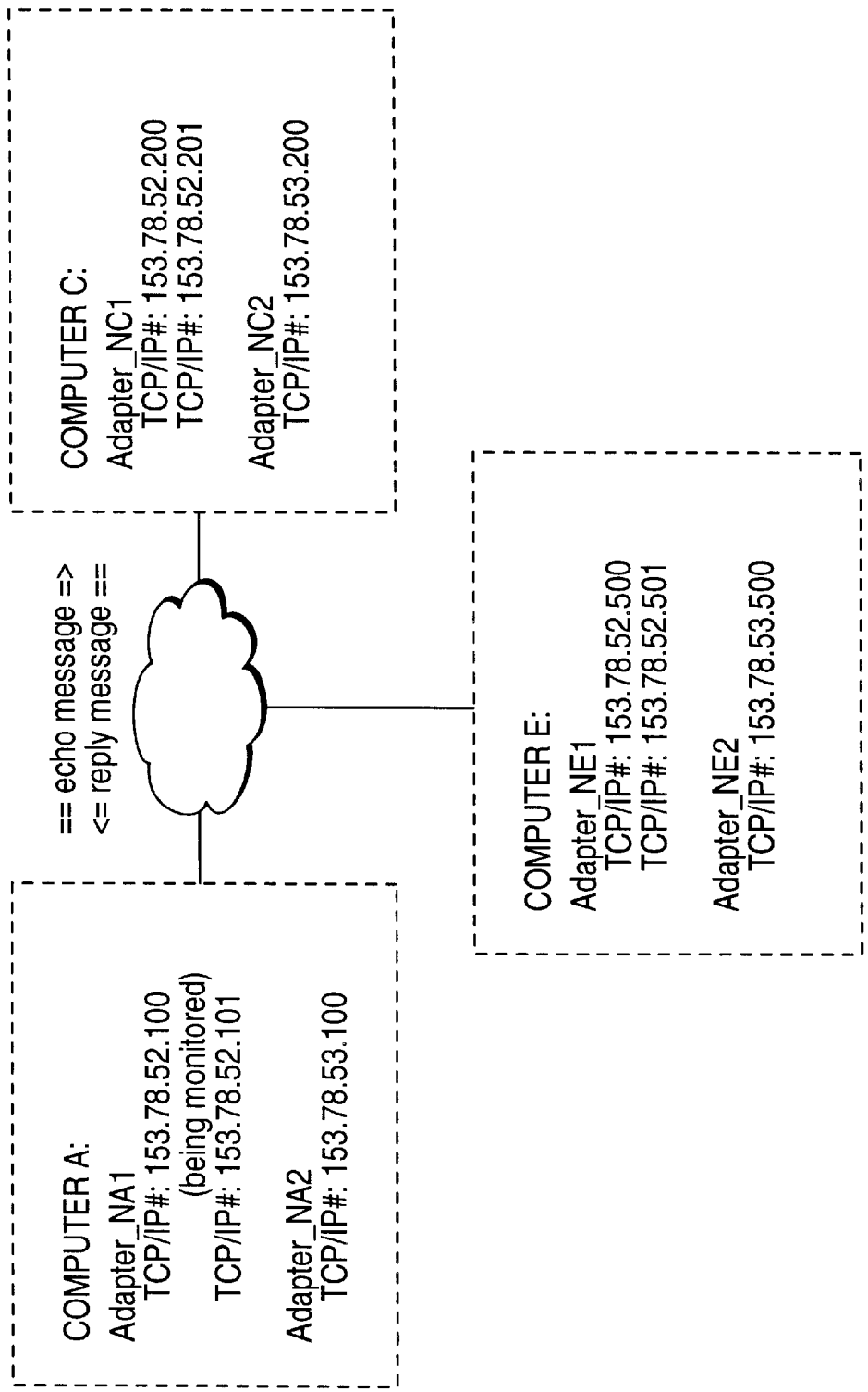
FIG. 2 is a diagram of addresses for three of the computers of FIG. 1.

In FIG. 2 instead of a single network adapter for each computer A, B, C, D, E there are two network adapters for each computer A, C, E. For simplicity, computers B and D are not depicted in FIG. 2. There are two network adapters (NA1 and NA2) depicted for computer A including network adapters and two network adapters (NC1 and NC2) depicted for computer C. Network adapter NA1 has two TCP/IP addresses 153.78.52.100 and 153.78.52.101 and network adapter NA2 has a TCP/IP address of 153.78.53.100. Network adapter NC1 has two TCP/IP addresses 153.78.52.200 and 153.78.52.201 and network adapter NC2 has a TCP/IP address of 153.78.53.200. Network adapter NE1 has two TCP/IP addresses 153.78.52.500 and 153.78.52.501 and network adapter NE2 has a TCP/IP address of 153.78.53.500.

Internet addresses used with TCP/IP can be just a number or a number represented by a name. The number is split up into four octets with periods, such as "127.248.119.149." An octet is an eight-bit storage unit. In the international community, the term "octet" is often used instead of "byte." Alternatively, this number can be associated with a specific name, like a company (www.ibm.com) or a government institution (www.govt.nasa.gov).

The third octet is known as the subnet. With the typical Class C Internet address there are 253 possible numbers with each subnet. Subnets are used by businesses, for example, to separate addresses according to floors of buildings to keep the numbering schemes organized. This way, when there is a problem it is more easily identifiable.

Figure 3:
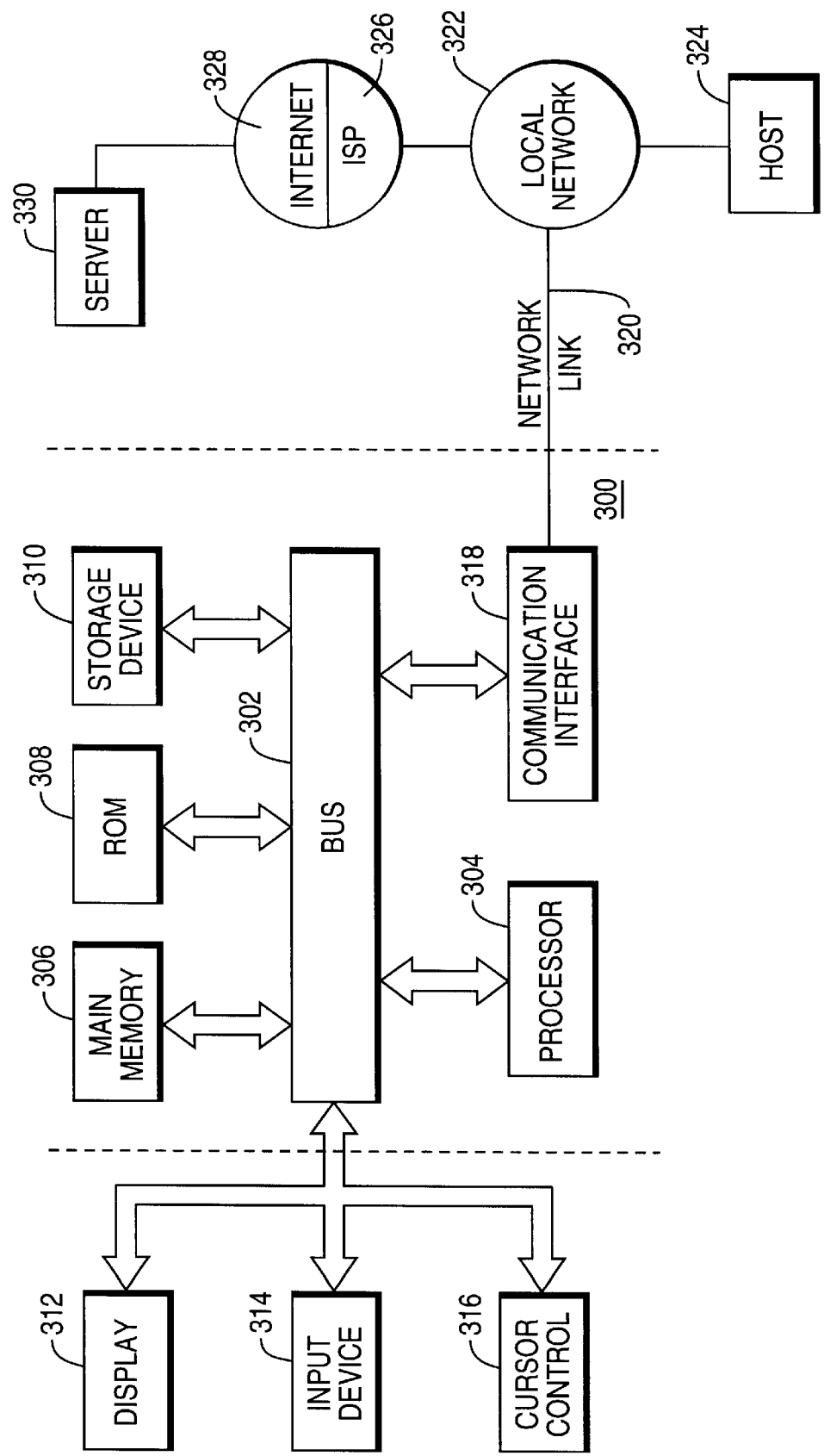
FIG. 3 is a high-level block diagram of an exemplary computer system with which the present invention can be implemented.

FIG. 3 is a block diagram of an exemplary computer wide-area network, such as the computers A, B, C, D, E depicted in FIG. 1, usable on the network 10. Although the computers A, B, C, D, E are depicted in FIG. 1 as a network device which is part of a wired local network, the computers A, B, C, D, E are also envisioned as being connected to the network 10 by a wireless link.

Computer system 300 includes a bus 302 or other communication mechanism for communicating information, and a processor 304 coupled with the bus 302 for processing information. Computer system 300 also includes a main memory 306, such as a random access memory (RAM) or other dynamic storage device, coupled to the bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to the bus 302 for storing static information and instructions for the processor 304. A storage device 310, such as a magnetic disk or optical disk, is provided and coupled to the bus 302 for storing information and instructions.

Computer system 300 may be coupled via the bus 302 to a display 312, such as a cathode ray tube (CRT) or a flat panel display, for displaying information to a computer user. An input device 314, including alphanumeric and other keys, is coupled to the bus 302 for communicating information and command selections to the processor 304. Another type of user input device is cursor control 316, such as a mouse, a trackball, or cursor direction keys for communicating direction information and command selections to processor 304 and for controlling cursor movement on the display 312. This input device typically has two degrees of freedom in two axes, a first axis (e.g., x) and a second axis (e.g., y) allowing the device to specify positions in a plane.

The processor 304 can execute sequences of instructions contained in the main memory 306. Such instructions may be read into main memory 306 from another computer-readable medium, such as storage device 310. However, the computer-readable medium is not limited to devices such as storage device 310. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in the main memory 306 causes the processor 304 to perform the process steps described below. In alternative embodiments, hard-wired circuitry may be used in place of or in combination with software instructions to implement the invention. Thus, embodiments of the invention are not limited to any specific combination of hardware circuitry and software.

Computer system 300 also includes the network adapter or communication interface 318 coupled to the bus 302. Communication interface 318 provides a two-way data communication as is known. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. In the preferred embodiment the communication interface 318 is coupled to the network cable 12. Wireless links may also be implemented. In any such implementation, communication interface 318 sends and receives electrical, electromagnetic or optical signals which carry digital data streams representing various types of information. Of particular note, the communications through interface 318 may permit transmission or receipt of echo/reply packets.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals which carry digital data systems. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

Figure 4:
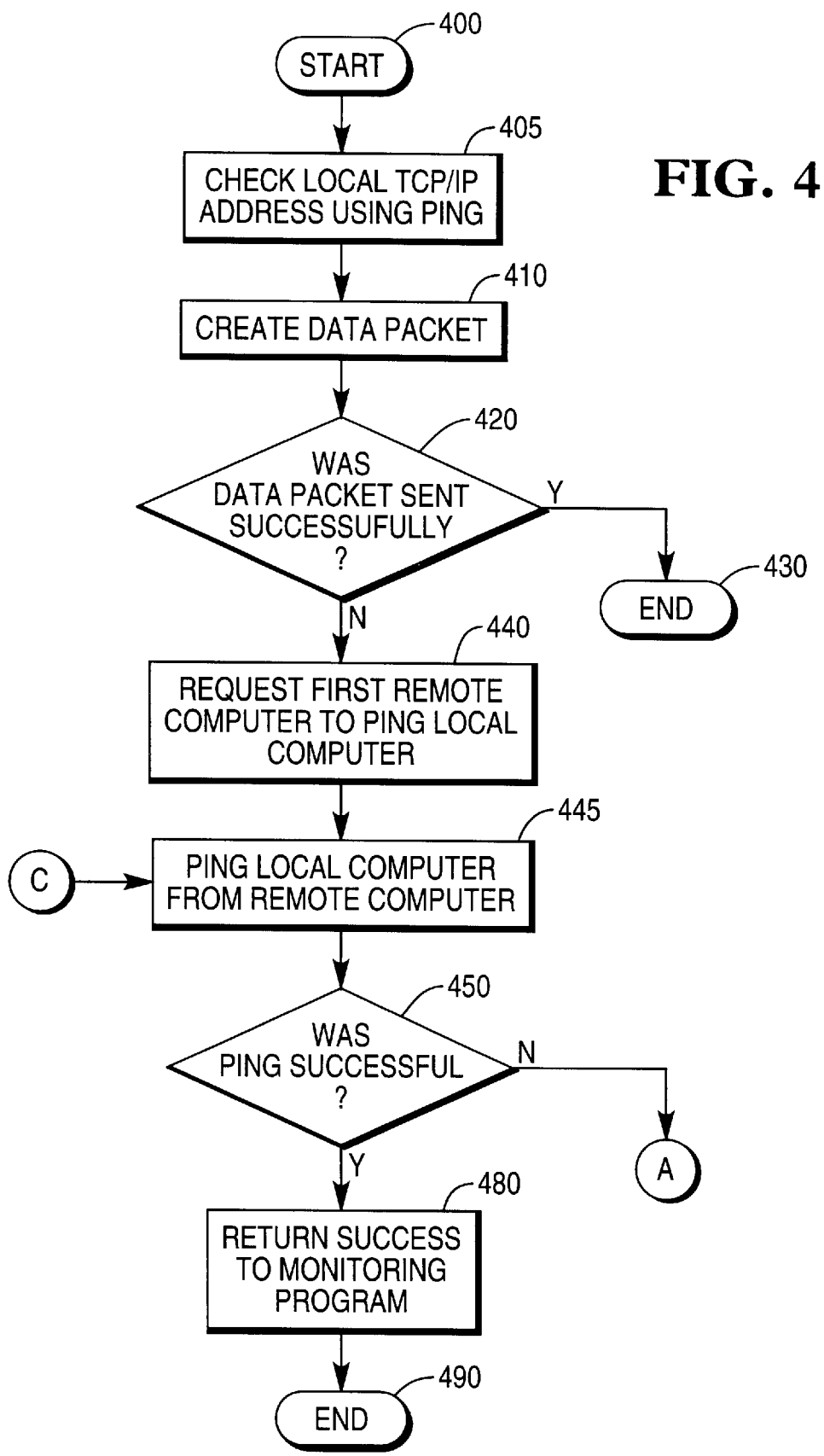
FIGS. 4–5 are flow diagrams of the steps of monitoring an IP address according to the present invention.
Figure 5:
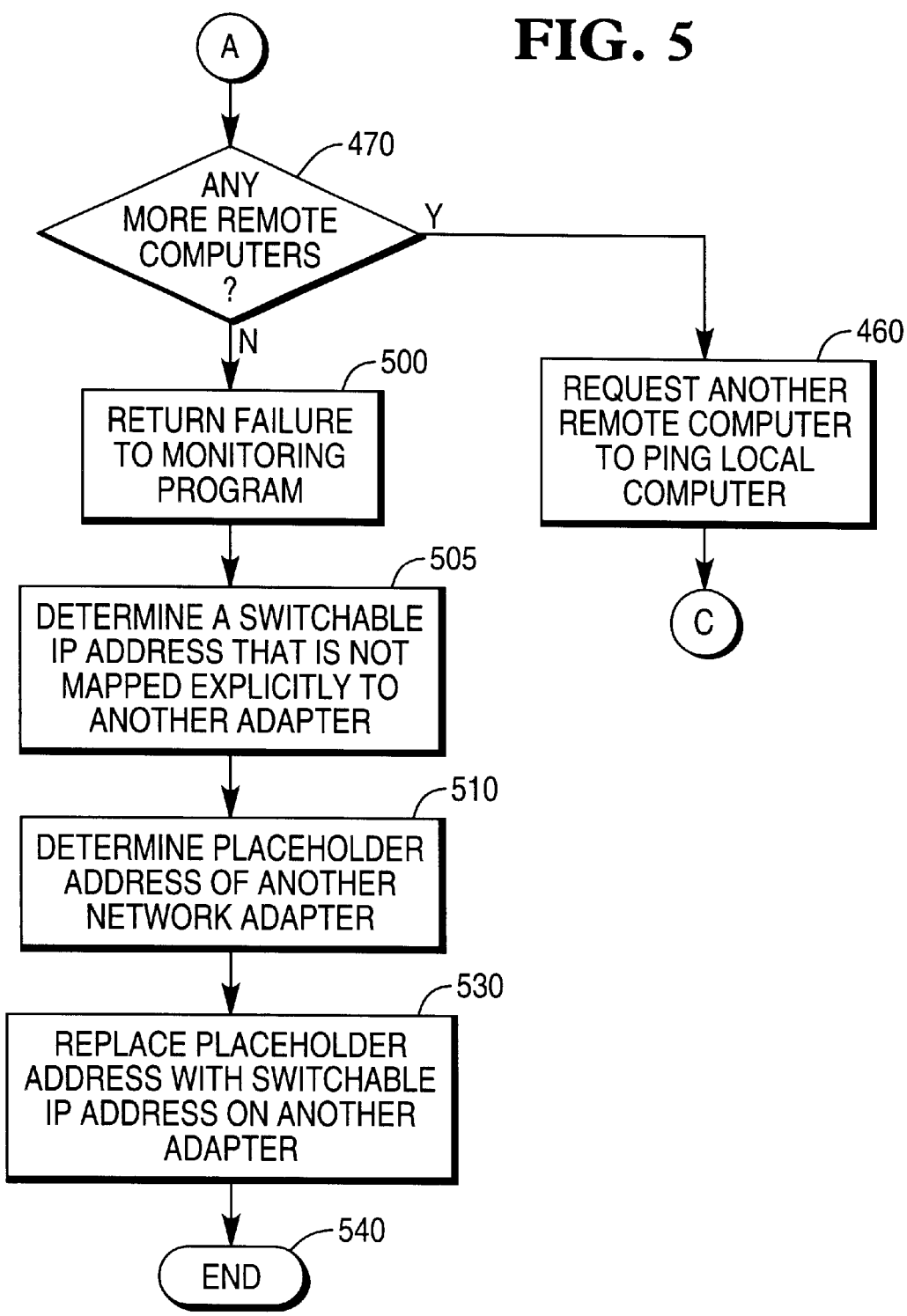

In FIGS. 4 and 5, the method of the present invention is illustrated with reference back to FIGS. 1 and 2. In this example, address 153.78.52.100 on adapter NA1 is being checked for functionality. At step 400, the method is started. At step 405, address 153.78.52.100 is pinged. At step 410, a data packet is created at computer A to send through the network adapter NA1 having TCP/IP address 153.78.52.100. At step 420, it is determined whether the data packet was sent successfully. An error message will be sent if the packet is not sent properly from computer A. Step 410 only determines if the network adapter can send a packet but does not determine whether computer A can receive data through address 153.78.52.100 of network adapter NA1. If the data packet was sent successfully, then the process is ended at step 430. If the data packet was not successfully sent, then at step 440, computer A requests a remote computer, such as computer C to ping computer A at step 445. Computer C pings TCP/IP address 153.78.52.100. At step 450, it must be determined whether the PING was successful (whether a reply packet was returned from address 153.78.52.100 to computer C). If the PING at step 445 was successful, then at step 480 success is returned to the monitoring program. If the PING at step 445 was not successful, then at step 470 it is determined whether there are any more remote computers from which to PING. If there are, then at step 460, an alternate remote computer from which to PING the local computer is determined and execution proceeds back to step 445, forming a loop. This loop continues to execute until at step 470 it is determined that the list of remote computers from which to PING has been exhausted. At that point, failure is returned to the monitoring program in step 500. At step 505, a switchable IP address not mapped explicitly to another adapter is determined by the monitoring program. At step 510, a place holder address of another available adapter (not shown) is determined. At step 530, the place holder address is replaced with the switchable IP address on the other adapter. At step 540, the process is complete.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of maintaining availability of a selected network address in a computer network where the selected network address is initially assigned to a first network adapter, said method comprising steps of:

(a) performing a diagnostic operation to determine whether said first network adapter is functioning according to predetermined criteria; and (b) if the first network adapter is not functioning according to said predetermined criteria, then moving said selected network address to a different network adapter by changing a place holder address thereof, said different network adapter having both a permanent network address and a place holder network address;

(c) such that communication continues between said selected network address and other computers in the computer network after a failure of said first network adapter and further wherein said different network adapter concurrently responds to both said selected network address and said permanent network address.

2. A method as set forth in claim 1, wherein said step of performing a diagnostic operation includes:

(d) sending an echo/reply packet from a second computer having another network address associated therewith to a first computer having said selected network address and said first network adapter associated therewith; and (e) determining that said first network adapter is not functioning according to said predetermined criteria if a reply packet is not returned to said second computer.

3. A method as set forth in claim 2, wherein the sending of the echo/reply packet uses a PING command.

4. A method as set forth in claim 2, comprising the following steps prior to step (d):

(f) sending a data packet from said first computer through said first network adapter; and (g) determining that said data packet was not sent.

5. A method as get forth in claim 1, wherein step (b) comprises steps of:

(d) determining an unused adapter; and (d) changing said place holder address on said unused adapter with said selected network address.

6. A method as set forth in claim 1, wherein said selected network address is an internet protocol (IP) address.

7. A method as set forth in claim 1, wherein said different network adapter is on a computer different from a computer having said first network adapter.

8. A method as set forth in claim 1, wherein said different network adapter is on the same computer along with said first network adapter.

* * * * *